Figure 1:
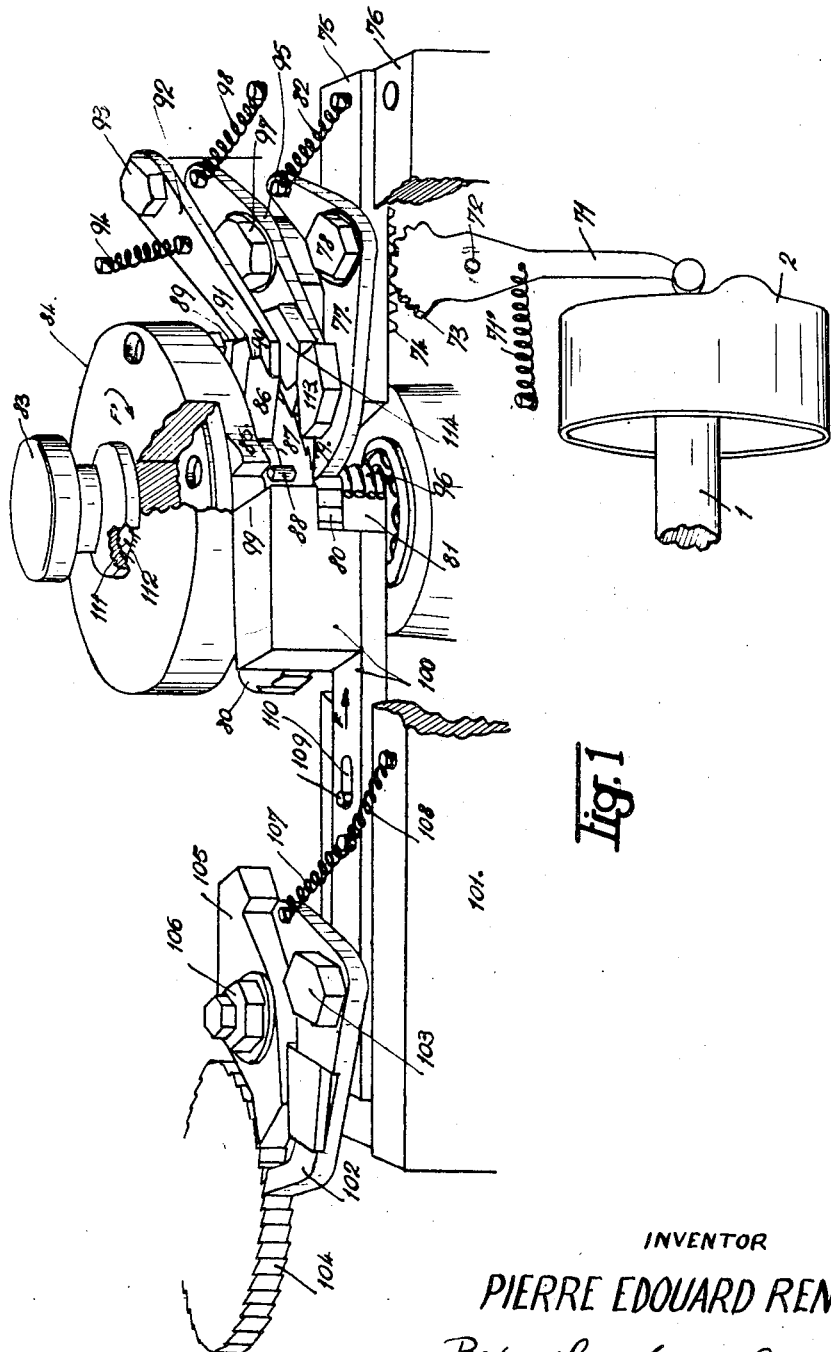

Jan. 22, 1957

P. E. RENOUX 2,778,037

SCREW CUTTING MACHINE FOR PROGESSIVELY CUTTING
SINGLE OR MULTIPLE PITCH THREAD

Filed July 23, 1952

INVENTOR

PIERRE EDOUARD RENOUX

By Linton and Linton
ATTORNEYS

United States Patent Office 2,778,037
Patented Jan. 22, 1957

2,778,037

SCREW CUTTING MACHINE FOR PROGRESSIVELY CUTTING SINGLE OR MULTIPLE PITCH THREAD

Pierre Edouard Renoux, Argenteuil, France, assignor to Societe Anonyme dite: Cri-Dan, Paris, France, a French company Application July 23, 1952, Serial No. 300,441

Claims priority, application France July 25, 1951

7 Claims. (Cl. 10—101)

This invention relates to an improvement in machine-tools for effecting simple or multiple pitch threadings.

In the known threading machines, the longitudinal displacements of the tool-holder are generally controlled by a rotating cam or pitch cam which is moved by the driving spindle 1 the piece being threaded while the gradual transversal displacement of the tool, after each cut, is controlled by another cam also driven by said spindle.

This invention has for its object an arrangement by means of which it is possible to produce, at will, from the pitch cam, for instance, or from the movement of the piece being threaded, either in the case of simple pitches, the desired feed of said intermittently rotating mechanism for each revolution of the simple pitch cam, for instance, or, in the case of multiple pitches, the same feed of said mechanism, but, this time, for $n$ revolutions of the pitch cam, $n$ being a function of the number of threads of the pitch in point.

This arrangement is moreover adapted to allow for the automatic return of the members to their initial position when the desired number of cuts has been effected, whether simple or multiple pitches are concerned.

According to this invention, on the shaft of the pitch cam for instance is mounted a cam which regularly causes a driven ratchet wheel to turn gradually by one or more tooth or teeth through a clutching device capable also of causing a driving ratchet wheel controlling the gradual transversal feed of the threading tool to move by the same amount.

The aforesaid clutching mechanism may be so adapted that for each revolution of the cam, the driving ratchet wheel may turn by one or more tooth or teeth until the desired number of cuts has been achieved by a corresponding number of motions of the driving ratchet wheel; or, oppositely, that the first revolution alone of the cam may produce one motion of the driving ratchet wheel, and the next revolution of the cam may have no effect on the latter until the desired number of threads of the pitch has been reached. In both cases, which have just been mentioned, once the desired number of cuts has been made, the clutching mechanism is adapted to operate immediately so as to produce again either continuous feed motions (one per revolution of the cam) of the driving ratchet wheel, or intermittent feed motions thereof (one for $n$ revolutions of the cam).

The present mechanism includes a pawl driven in a reciprocating motion by the cam and actuating the driven ratchet wheel keyed on its axis; a finger carried by a disc which can be locked in any desired angular position on the axis of the driven ratchet wheel, which, after the desired number of cuts has been obtained without a transversal motion of the tool taking place and when the next impulse is imparted to the member carrying said pawl, displaces an alidade mounted freely on said axis in such a way that said alidade causes the driven ratchet wheel to disengage from its retaining pawl and the driving pawl of said ratchet wheel to part during the back movement of said pawl which releases the driven ratchet wheel which rotates in the opposite direction under the action of its return spring bringing the alidade back into its initial position. When the displacement of the free alidade takes place, a projecting part of said disc strikes against a sliding rule carrying the pawl which drives the driving ratchet wheel thus producing a further transversal feed of the tool after the desired number of cuts has been achieved.

When it is desired to effect simple pitches, the aforementioned mechanism is rendered inoperative by releasing the driving pawl of the driven ratchet wheel and the member which carries it is connected with the rule carrying the driving pawl of the driving ratchet wheel; or the free alidade can be locked in the appropriate position.

Further characteristics of the invention will appear from the ensuing description given by way of a nonrestrictive example, with reference to the attached drawing in which the figure is a perspective view of the invention, some parts thereof having been partially omitted.

Referring now more particularly to the accompanying drawing wherein like and corresponding parts are designated by similar reference characters, numeral 1 is the shaft of the cam 2 actuating, at each revolution, the extremity of a lever 71, pivoted at 72, provided with a return spring 71' and formed with teeth 73 meshing with a rack 74 cut in a slide 75 slidable on a fixed base 76 and animated with a reciprocating movement during each cut. The slide 75 has an oscillating pawl 77 pivoted at 78 on said slide, the extremity 79 of which meshes with a driven ratchet wheel 80 integral with a shaft 81. A spring 82 constantly urges back said pawl into contact with the ratchet wheel 80. A disc 84 on said shaft 81 can be locked in a given position by means of a milled knob 83 forming a tightening screw and disc 84 has on its periphery a cam 85. On said shaft 81 freely turns a ring 87 provided with a lateral finger 86, the angular clearance of which with respect to the shaft 81 is limited, on the one hand, by a finger 88 integral with the ratchet wheel 80 and, consequently, with the shaft 81 and, on the other hand, by a finger 89 integral with the disc 84.

The extremity of the finger 86 can engage either of the notches 90 or 91 cut in an oscillating lever 92, pivoting at 93, and constantly urged back by a spring 94 into contact with the finger 86. The extremity of the latter which is thicker than the lever 92 can also cooperate with a retaining pawl 95 the purpose of which is to retain in position the ratchet wheel 80 in spite of the effect of the return spring 96 during the backward movement of the pawl 77. The retaining pawl 95 is pivoted at 97 and a spring 98 tends to urge it back constantly into contact with the ratchet wheel 80.

The relative positions of the cam 85 and the finger 89 are such that, upon the latter coming into contact with the finger 86, the cam 85 comes into contact with the block 99 of another slide 100 sliding on a base 101 and having a pawl 102 pivoted at 103 actuating a driving ratchet wheel 104, held in position by a retaining pawl 105 pivoted at 106. A spring 107 tends to urge back constantly the pawl 102 into contact with the ratchet wheel 104.

A spring 108 tends constantly to bring back the slide 100 in the direction of the arrow "F" against the fixed pin 109 which slides through a groove 110.

The device operates as follows:

Supposing that it is desired to make a four pitch threading, the disc 84 will be so positioned respect to the shaft 81 that the index 111 carried by the latter will be opposite the graduation "four" of the graduated scale 112 carried by the disc 84.

This adjustment being effected, the angular clearance of the finger 86 between the two fingers 88 and 89 corresponds to three teeth of the ratchet wheel 80. It is the same for the interval between the cam 85 of the disc 84 and the block 99 of the slide 100. It is then obvious that, during three successive cuts, the reciprocating movement of the slide 75 will have the effect of causing the shaft 81 to rotate by the total angle corresponding to three teeth of the ratchet wheel 80, without any motion being transmitted to the slide 100. When a fourth movement will be imparted to the slide 75, the movement of the shaft 81 is transmitted to the rule 100 through the contact of the cam 85 and block 99, and, therefore, a new transversal feed of the tool is produced. But, at the same time, the finger 89 will push the finger 86 into the notch 90 of the lever 92, and drive the retaining pawl 95 away from the ratchet wheel 80. During the backward motion of the slide 75 which follows this movement, the block 113 carried by the pawl 77 strikes against the block 114 carried by the pawl 95 which causes the pawl 77 to move apart and therefore releases the ratchet wheel 80 and the shaft 81 which the spring 96 causes to rotate in the opposite direction to the arrow "F" until the finger 88 meets the finger 86 and drives it in its movement, bringing it back into the notch 91 of the lever 92; the mechanism is thus brought back into its initial position and the device is ready for another series of four cuts. Of course, the number of successive cuts effected without any transversal feed of the tool taking place may be determined at will within the limits afforded by the number of teeth of the ratchet wheel 80 which may be as high as desired.

To achieve simple pitches, one may either lock the finger 86 between the fingers 88 and 89, or release the pawl 77 from the ratchet wheel 80 and connect the slides 75 and 100 by any suitable means.

What I claim is:

1. Device for effecting simple or multiple threadings with a threading machine-tool, comprising a shaft controlling the longitudinal displacements of the tool-holder, a driven ratchet-wheel, a cam mounted on said shaft, an oscillating lever actuated by said cam, a set of teeth on said lever, a rack meshing with said set of teeth, a slide carried by said rack, a pawl carried by said slide and driven in a reciprocating movement by said cam for actuating said driven ratchet wheel in one direction, a rotatable shaft having said driven ratchet wheel fixedly mounted thereon, a second pawl for retaining said driven ratchet wheel from rotation in an opposite direction, a disc capable of being locked in any desired angular position on said shaft of said driven ratchet-wheel, a finger carried by said disc, a second finger freely positioned on said shaft for being displaced by said first-mentioned finger after the desired number of thread cuts has been achieved without any transversal feed of the tool taking place, and during the next movement imparted to said driving pawl by said cam, said free finger being positioned for engaging said retaining pawl upon displacement of said free finger withdrawing said retaining pawl from and releasing said driven ratchet wheel, said driving pawl and retaining pawl being relatively positioned for causing portions thereof to engage upon movement of said driving pawl and withdrawal of said retaining pawl preventing said driving pawl from engagement with said driven ratchet wheel, a member integral with said driven ratchet wheel and adapted to bring back said free finger into its initial position, a spring for returning said driven ratchet wheel to its initial position upon being released, said rotary disc having a projection provided on the periphery thereof, a second slide against which said projection abuts when said first mentioned finger abuts said free finger, a pawl carried by said second slide, a driving ratchet-wheel being actuated by said second slide carried pawl providing a further transversal feed of the tool after the desired number of cuts.

2. Device for effecting simple or multiple threadings with a threading machine tool comprising a shaft controlling the longitudinal displacements of the tool holder, a driven ratchet wheel, a cam mounted on said shaft, a pawl for being driven in a reciprocating movement by said cam and actuating said driven ratchet wheel in one direction, a rotatable shaft having said driving ratchet wheel fixedly mounted thereon, a pawl for retaining said driven ratchet wheel from rotation in an opposite direction, a disc capable of being locked in any desired angular position on said shaft of said driven ratchet wheel, a finger carried by said disc, a second finger freely mounted about said shaft for being displaced by said first-mentioned finger after the desired number of cuts have been achieved without any transversal feed of the tool taking place and during the next movement imparted to said driving pawl by said cam so as to disengage said retaining pawl from said driven ratchet wheel, said retaining pawl having a sloping side, said pawl driving said driven ratchet wheel having a sloping side positioned for bearing against said retaining pawl slope upon movement of said driving pawl so as to disengage said driving pawl from contact with said ratchet wheel during disengagement of said retaining pawl from said driven ratchet wheel, a spring for returning said driven ratchet wheel thus released, said rotary disc having a peripheral projection, a slide against which abuts said projection upon contact of said first mentioned finger with said free finger, a driving ratchet wheel and pawl carried by said slide for driving said driving ratchet wheel producing a further transversal feed of the tool after the desired number of thread cuts.

3. Device for effecting simple or multiple threadings with a threading machine tool comprising a shaft for controlling the longitudinal displacements of the tool holder, a driven ratchet wheel, a cam mounted on said shaft, a pawl driven in a reciprocating movement by said cam and actuating said driven ratchet wheel in one direction, a shaft having said ratchet wheel fixedly mounted thereon, a pawl for retaining said driven ratchet wheel against return to its initial position, a disc capable of being locked in any desired angular position on said shaft of said driven ratchet wheel, a finger on said disc, a second finger freely carried by said shaft for being displaced by said first-mentioned finger after a given number of thread cuts have been obtained, a pivotally mounted lever, said lever having a notch in which normally rests the end of said free finger, said lever having a second notch into which said free finger, when displaced by said first-mentioned finger, is driven said free finger being positioned when displaced to said second notch for causing disengagement of said retaining pawl from said driven ratchet wheel, means carried by said retaining pawl and driving pawl for withdrawing said driving pawl from contact with said ratchet wheel during the movement of said driving pawl and displacement of said retaining pawl, a member integral with said driven ratchet wheel and adapted to bring said free finger back into its initial position into said first notch, a spring for returning said driven ratchet wheel to its initial position upon being released, said rotary disc having a projection provided on the periphery thereof, a slide against which abuts said projection when said first mentioned finger contacts said free finger, a pawl carried by said slide, a driving ratchet wheel being actuated by said slide carried pawl and producing a further transversal feed of the tool after the desired number of cuts.

4. Device for effecting simple or multiple threadings with a machine tool comprising a shaft controlling the longitudinal displacements of the tool holder, a driven ratchet-wheel, a cam mounted on said shaft, a pawl for being driven in a reciprocating movement by said cam and actuating said driven ratchet wheel in one direction, a shaft having said driven ratchet wheel fixedly mounted thereon, a pawl for retaining said driven ratchet wheel against a return to its initial position, a disc capable of being locked in any desired angular position on said shaft of said driven ratchet wheel, a finger on said disc, a second finger freely mounted about said shaft for being displaced by said first-mentioned finger after a desired number of thread cuts have been obtained without any transversal feed of the tool taking place during the next movement imparted to said driving pawl by said cam, said free finger being positioned when displaced for withdrawing said retaining pawl from said driven ratchet wheel, means carried by said retaining pawl and driving pawl for withdrawing said driving pawl from contact with said ratchet wheel during the movement of said driving pawl and displacement of said retaining pawl, a member integral with said driven ratchet wheel and adapted to bring said free finger back into its initial position, a spring for returning said driven ratchet wheel thus released to its initial position, said rotary disc having a peripheral projection, a slide against which abuts said projection when said first mentioned finger abuts said free finger, a pawl carried by said slide, a driving ratchet wheel operable by said slide carried pawl for producing a further transversal feed of the tool after the desired number of thread cuts, means for locking said free finger between said first-mentioned finger and said member integral with said driven ratchet wheel for effecting simple threadings.

5. Device for effecting simple or multiple threadings with a machine tool comprising a shaft controlling the longitudinal displacements of the tool holder, a driven ratchet wheel, a cam mounted on said shaft, a pawl driven in a reciprocating movement by said cam and actuating said driven ratchet wheel in one direction, a shaft having said ratchet wheel fixedly mounted thereon, a pawl for retaining said driven ratchet wheel against a return to its initial position, a disc capable of being locked in any desired angular position on said shaft of said driven ratchet wheel, a finger on said disc, a second finger freely connected to said shaft for being displaced by said first-mentioned finger after the desired number of thread cuts have been obtained without any transversal feed of the tool taking place and during the next movement imparted to said driving pawl by said cam, said free finger being positioned when displaced for moving said retaining pawl from engagement with said ratchet wheel, said retaining pawl and driving pawl having portions thereof arranged for engaging upon the movement of said driving pawl and displacement of said retaining pawl for preventing said driving pawl from engaging said driven ratchet wheel, a member integral with said driven ratchet wheel and adapted to bring said free finger back into its initial position, a spring for returning said driven ratchet wheel when released to its initial position, said rotary disc having a peripheral projection, a slide against which abuts said projection when said first mentioned finger contacts said free finger, a pawl carried by said slide, a driving ratchet wheel operable by said slide carried pawl for producing a further transversal feed of the tool after the desired number of thread cuts, means for disengaging said pawl driving said driven ratchet wheel therefrom and means for at times connecting the member carrying said driving pawl with said slide carrying said pawl for driving the driving ratchet wheel for effecting simple pitch threadings.

6. Device for effecting simple or multiple threadings with a machine-tool comprising a shaft controlling the longitudinal displacements of the tool holder, a rotatably mounted driven ratchet-wheel, a cam mounted on said shaft, a pawl driven in a reciprocating movement by said cam for rotating said driven ratchet-wheel in one direction, a second pawl for retaining said driven ratchet wheel from rotation in an opposite direction, a disc capable of being locked in any desired angular position with said driven ratchet-wheel, a finger on said disc, a second finger freely mounted relative to said disc for being displaced by said first-mentioned finger after the desired number of thread cuts has been obtained without any transversal feed of the tool taking place and during the next movement imparted to said driving pawl and thus said disc by said cam, said rotary disc having a projection provided on the periphery thereof, a slide against which abuts said projection when said first mentioned finger contacts said free finger, a pawl carried by said slide, a driving ratchet wheel being actuated by said slide carried pawl and producing a further transversal feed of the tool after the desired number of cuts, means operable by said displaced free finger for causing both disengagement and release of said driven ratchet wheel from said retaining pawl, a pair of blocks each positioned on one of said driving and retaining pawls for contacting one another during movement of said driving pawl and disengagement of said retaining pawl for preventing said driving pawl from contacting said ratchet wheel, a member integral with said driven ratchet-wheel and adapted to bring said free finger back into its initial position with the return of said driven ratchet wheel to its initial position, a spring for returning said driven ratchet wheel to its initial position upon being released.

7. Device for producing screw threads of simple or multiple pitch on a machine having a thread cutting tool including a shaft controlling the longitudinal displacements of the tool-holder comprising a driving ratchet wheel controlling the progressive transverse advance of the tool, a driven ratchet wheel, reciprocatory means operatively connected to said shaft for incrementally rotating said driven ratchet wheel, a clutch mechanism, means for locking said clutch mechanism to said driven ratchet wheel in a predetermined position, means for rotating said driving ratchet wheel, a cam on said clutch mechanism being positioned for contacting and operating said means for rotating said driving ratchet wheel causing a transversal advance of the tool when said clutch mechanism has turned a number of teeth of the driven ratchet wheel corresponding to the number of threads of the screw threads to be completed, said cam being initially spaced from said means for rotating said driven ratchet wheel so as to allow said clutch mechanism to turn a given number of teeth of said driven ratchet wheel without causing an advance of said driving ratchet wheel, a finger mounted on said clutch mechanism for movement with said cam, an abutment means for preventing rotation of said driven ratchet wheel towards its initial position, a pivotally mounted finger movable by contact of said first mentioned finger therewith for positioning said abutment means in the path of reciprocation of said reciprocatory means for separating said reciprocatory means from engagement with said driven ratchet wheel and releasing said abutment means from engagement with said driven ratchet wheel, a spring for restoring said clutch mechanism to its initial position ready for again executing a new series of passes upon the separation of said driven ratchet wheel from said reciprocatory means and said abutment means.

References Cited in the file of this patent
UNITED STATES PATENTS 2,588,205    Castelli _____ Mar. 4, 1952